United States Patent [19]

Blake et al.

[11] Patent Number: 4,606,748

[45] Date of Patent: * Aug. 19, 1986

[54] METHOD FOR PRODUCING CERAMIC-GLASS-CERAMIC SEALS BY MICROWAVE HEATING

[75] Inventors: Rodger D. Blake, Santa Fe; Thomas T. Meek, Los Alamos, both of N. Mex.

[73] Assignee: The United States of America as represented by the Department of Energy, Washington, D.C.

[*] Notice: The portion of the term of this patent subsequent to Jul. 16, 2002 has been disclaimed.

[21] Appl. No.: 659,586

[22] Filed: Oct. 10, 1984

[51] Int. Cl.$^4$ ............................................. C03B 23/20
[52] U.S. Cl. ............................................. 65/36; 65/33
[58] Field of Search ...................... 501/14, 15, 17, 20, 501/21; 69/17, 33, 36, 43; 219/10.55 M

[56] References Cited

U.S. PATENT DOCUMENTS

| | | | |
|---|---|---|---|
| 3,180,742 | 4/1965 | Bennett et al. | 501/20 |
| 3,346,357 | 10/1967 | Baak | 65/43 |
| 3,585,258 | 6/1971 | Levinson | 264/26 |
| 3,732,048 | 5/1973 | Guerga et al. | 425/174.4 |
| 3,756,839 | 9/1973 | Rao | 106/75 |
| 3,953,703 | 5/1976 | Hurwitt | 219/10.55 M |
| 4,003,368 | 1/1977 | Maxel | 126/390 |
| 4,058,387 | 11/1977 | Nofliger | 65/43 |
| 4,147,911 | 4/1979 | Nishitani | 219/10.55 M |
| 4,179,596 | 12/1979 | Bjork | 219/10.55 M |
| 4,219,361 | 8/1980 | Sutton et al. | 219/10.41 |
| 4,273,950 | 6/1981 | Chitre | 29/572 |
| 4,307,277 | 12/1981 | Maeda et al. | 219/10.55 R |
| 4,529,856 | 7/1985 | Meek et al. | 219/10.55 M |
| 4,529,857 | 7/1985 | Meek et al. | 219/10.55 M |

OTHER PUBLICATIONS

Smith, "Microwaves and Material Science in Foundry Applications", Am. Chem. Soc., Org. Coat. Plast. Chem., 39, pp. 324–328, 1978.

Cummisford, "Curing Spirit with Microwave", Am. Chem. Soc., Org. Coat. Plast. Chem., 39, pp. 329, 1978.

Cole, "Sodium Silicate Bonded Sand Bodies Cured with Microwave Energy", Am. Chem. Soc., Org. Coat. Plast. Chem., 39, pp. 330–335, 1978.

Partridge, "Glass-to-Metal Seals", pp. 228–231, 1949.

Brown, "Ceramic Adhesive-Braze Alloy Combination Technique", Amer. Soc. Metals, May 1964, pp. 21–25.

*Primary Examiner*—S. Leon Bashore
*Assistant Examiner*—Michael K. Boyer
*Attorney, Agent, or Firm*—Joseph M. Hageman; Paul D. Gaetjens; Judson R. Hightower

[57] ABSTRACT

Method for producing a ceramic-glass-ceramic seal by the use of microwave energy, and a sealing mixture which comprises a glass sealing material, a coupling agent, and an oxidizer. The seal produced exhibits greater strength due to its different microstructure. Sodium nitrate is the most preferred oxidizer.

10 Claims, 1 Drawing Figure

METHOD FOR PRODUCING CERAMIC-GLASS-CERAMIC SEALS BY MICROWAVE HEATING

This invention is the result of a contract with the Department of Energy (Contract No. W-7405-ENG-36).

BACKGROUND OF THE INVENTION

The present invention relates generally to a mixture and method for producing a ceramic-glass-ceramic seal by the use of microwave heating.

Conventional sealing of ceramics has been done by use of resistant heating furnaces, which consume relatively large quantities of energy, time and manpower while subjecting the ceramics to rather hostile environments. An alternative method of producing seals was disclosed in U.S. Pat. Nos. 4,529,856 and 4,529,857 for ceramic-glass-metal and ceramic-glass-ceramic materials respectively. These seals were formed by subjecting a slurry comprising a coupling agent, such as watch oil, and a sealing material, such as glass, evenly spread between the ceramic and ceramic or metal substrates, to microwave energy in order to cause heating and formation of the seal. Although this use of microwave energy represented an improvement over the conventional resistant heating furnace method, problems still remained in that the final temperature of the sealing material never went beyond 700°–800° C. It was thought this was due to the need to raise the sealing glass temperature high enough so that the sealing glass itself could better couple to the microwave energy instead of being largely transparent to the microwaves.

Therefore it is an object of the present invention to provide an improved method of forming ceramic-glass-ceramic seals.

It is the further object of the present invention to provide an easily automated, low energy, efficient, fast, and effective method for forming ceramic-glass-ceramic seals at temperatures exceeding 800° C.

It is yet another object of the present invention to provide ceramic-glass-ceramic seals with an improved microstructure and strength.

SUMMARY OF THE INVENTION

To achieve the foregoing and other objects, and in accordance with the purposes of the present invention, as embodied and broadly described herein, the method of this invention may comprise preparing a mixture comprising a glass sealing material, a coupling agent, and an oxidizer; applying the mixture to a plurality of ceramic workpieces for sealing; enclosing same with other such workpieces, surrounding the mixture and plurality of ceramic workpieces with an insulative material; microwaving said mixture and plurality of ceramic workpieces at a power, time and frequency sufficient to ignite the oxidizer and to cause a liquid phase seal to form; and allowing the seal and workpieces to cool, thereby securing a ceramic-glass-ceramic seal.

The present invention may also comprise, in accordance with its objects and purposes, a mixture to be used for producing a ceramic-glass-ceramic seal upon exposure to microwave radiation sufficient to cause a liquid phase seal to form, said mixture comprising a glass sealing material, a coupling agent, and an oxidizer that ignites after coupling agent exposure to microwave radiation.

Additionally, the present invention may also comprise, in accordance with its objects and purposes, the ceramic-glass-ceramic seal produced by the above described method.

An advantage of the present invention is derived from the significant time and energy savings compared to conventional, i.e., radiant, heating methods.

Another advantage of the present invention is that a different microstructure, resulting in a stronger seal, is produced by the high temperatures induced by the inclusion of the oxidizer in the sealing mixture.

Still another advantage of the present invention is the reduced time necessary for cool down compared to conventional, i.e., radiant, heating.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWING

The accompanying drawing, which is incorporated in and forms a part of the specification, illustrates an embodiment of the present invention and, together with the description, serves to explain the principles of the invention. In the drawing.

DETAILED DESCRIPTION OF THE PREFERRED EMBODIMENTS

Figure 1:
FIG. 1 is a photomicrograph of a polished section of a ceramic-glass-ceramic seal.

The first step in forming a ceramic-glass-ceramic seal by use of microwave heating is to prepare a mixture containing the coupling agent, glass sealing material, and oxidizer. The glass sealing material is most often a glass with thermal expansion properties which are compatible with the materials, such as ceramic substrates, to be joined. Coupling agents can be such materials as oils, specifically watch oil, glycerol, silicon carbide, water and sugar. The preceding coupling agents all couple, i.e., absorb microwaves and convert the energy into thermal energy, to microwaves of 2.45 GHz frequency. Other molecular bonds also couple to microwaves of 2.45 GHz frequency. These bonds include those present in $NO_2$, $NO_3$, $CO_2$, and $NH_3$ groups. When an oxidizer includes one of these groups, the oxidizer can provide heat by convection to raise the temperature of the glass sealing material as well as raise its own temperature towards its ignition point. As the temperature of the glass sealing material is raised, the material ceases to be transparent to microwaves and it also starts to generate heat as a result of coupling to the microwaves. Depending upon the specific glass sealing material chosen, this coupling may begin before or after the temperature increase in the material due to ignition of the oxidizer. Nitrates are preferred oxidizers, with sodium nitrate the most preferred oxidizer. Mixing of the ingredients for the sealing mixture is done by conventional techniques. This mixture is then spread between the workpieces to be sealed together.

The ceramic workpiece substrates can be composed of any one of the vast number of ceramic substances. For illustration purposes, alumina workpieces were used. Typically the test ceramic workpieces were about 25 centimeters square and 0.06 centimeters thick. The mixture described above is then spread evenly on one workpiece and the other workpiece to be coupled to it is placed on top, enclosing it.

The procedure for microwave heating the mixture between the ceramic workpieces is described in U.S. Pat. No. 4,529,857 which is specifically incorporated herein by reference. Briefly, in that patent application, after the ceramic workpieces are ready for heating in order to be sealed, they are surrounded with an insulative material, placed in a cavity, usually called an oven, for exposure to microwave energy, and then heated by the microwave energy sufficiently long to raise the glass to a high enough temperature so that a glass seal is formed. However, in the present method, after adequate additional exposure to the microwave energy to insure ignition of the oxidizer, when high temperature glass sealing material is used, the material is thus heated sufficiently (1000°) to allow it to couple to the microwave energy. This coupling further heats the high temperature glass sealing material to its vitrification temperature. The glass sealing material then reacts with the alumina substrates and diffuses into the workpieces. Finally the sealed ceramic workpieces are similarly removed from the microwave oven and allowed to cool. By allowing thorough liquification and penetration, a diffusion bond is formed between the substrates. This diffusion bond, with its resulting changes in dielectric properties of the material being subjected to microwaves, can initiate decoupling of the materials and hence the end of any heating due to the microwaves effect on the glass sealing material.

The oxidizer is ignited by the convection of heat from the coupling agent. Nitrates as mentioned previously, are susceptible to direct heating by microwave radiation, however this is not necessary to guarantee ignition of an oxidizer. When the oxidizer is ignited, the extra heat thus provided insures a thorough melting of the sealing mixture and the sealing mixture's penetration into, as opposed to merely onto, the ceramic workpieces. Due to the extra heat generated by the ignition of the sodium nitrate, the mixture temperature can go as high as 1000° C. At this temperature the high temperature glass sealing material couples sufficiently to the microwave enery to continue heating. Without use of an oxidizer, temperatures seldom exceeded 750° C. This method thus can produce special high temperature glass-ceramic-glass seals wherein the glass sealing material selected does not begin to melt until the temperature exceeds 1250° C.

As a result of reaching these higher temperatures during the sealing process, the sealing mixture's penetration into the substrate produces a homogeneous microstructure with no zone of sealing material remaining where the two substrate surfaces were. The homogeneous microstructure results in a stronger seal than nonhomogeneous microstructures produced by conventional heating means. Ignition of the oxidizer and subsequent heating of it and the coupling agent result in the disappearance of these materials. Careful selection of the oxidizer, avoiding those with metals that will not be removed from the sealing mixture by ignition, guards against contamination of the sealed together substrates. Contamination of the sealed substances may introduce undesirable changes in the dielectric properties.

EXAMPLE 1

A sealing mixture was prepared with the following ingredients:
sodium nitrate (J. T. Baker Chemical Co.): 0.5 gm
glycerol (Mallinckrodt Inc.): 3.78 gm
glass: 0.5 gm It should be noted that the above glass, vitrifies at 1450° C. by use of conventional heating means, and is made up of 273 gms potassium alumina silicate (K Feldspar), 24 gms aluminum silicate (Edgar Plastic Kaolin), 3 gms of aluminum silicate (Bentonite), and 180 cc of distilled water. After mixing, the sealing mixture was spread evenly between two aluminum workpieces that were 5.08 cm × 5.08 cm × 0.0635 cm. The alumina workpieces were furnished by 3M Company.

The prepared workpieces were placed in a Zircar AL-15 insulative cavity and then were placed in the area of highest microwave intensity in a Litton Model 1521 microwave oven.

The oven was turned onto full power and allowed to run 99 minutes. The resulting seal that was formed is shown in FIG. 1. As can be seen from the figure, the seal is more than a zone of sealing material that merely wetted the alumina workpieces' surfaces. Instead a distinct seal is not seen. A distinctly different microstructure for the sealed together workpieces was thus produced when the glass sealing material penetrated beyond the workpiece surface and diffused completely into the workpiece. The middle line, where visible, represents epoxy material used in preparing a polished section for photographic analysis. The highest temperature achieved during the application of microwave energy was from 1450°–1500° C. Because the glass sealing material is not confined to the narrow region of the workpieces' surfaces, the sealed together workpieces now have different electrical properties, mainly superior electrical insulation properties caused by the lack of a distinct sealing region that is low in alumina.

EXAMPLE 2

The following mixture was made and put between ceramic substrates, then placed in a thermally insulative cavity and finally exposed to microwaves in a Litton Model 1521 oven, as in Example 1:
cobalt nitrate—$Co(NO_3)_2$: 1.5 gm
glycerol $HOCH_2CHOHCH_2OH$: 1.2 gm
Owens Illinios CV-102B glass (melts @ 380° C.): 7.2 gm
$H_2O$: 2.5 gm However, the oven was run only 30 minutes. A ceramic-glass-ceramic seal formed.

EXAMPLE 3

The following mixture was made into a ceramic-glass-ceramic seal as in Example 2:
manganese nitrate $Mn(NO_3)_2$: 2.3 gm
glycerol: 1.2 gm
O.I. CV-102B glass: 7.2 gm
$H_2O$: 2.5 gm

EXAMPLE 4

The following mixture was made into a ceramic-glass-ceramic seal as in Example 2:
nickelous nitrate $Ni(NO_3)_2$: 1.8 gm
glycerol: 1.2 gm
O.I. CV-102B glass: 8 gm
$H_2O$: 2.8 gm

EXAMPLE 5

The following mixture was made into a ceramic-glass-ceramic seal as in Example 2:
nickelous nitrate Ni(NO$_3$)$_2$: 1.8 gm
glycerol: 1.2 gm
Owens Illinois XS-1175 glass (melts @ 500° C.): 8 gm
H$_2$O: 2.8 gm The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A method for producing a ceramic-glass-ceramic seal comprising the steps of:
   a. preparing a mixture comprising a glass sealing material, a coupling agent, and an oxidizer;
   b. applying said mixture to a plurality of ceramic workpieces for sealing;
   c. enclosing said ceramic workpieces with other such workpieces;
   d. surrounding said mixture and plurality of ceramic workpieces with an insulative material;
   e. microwaving said mixture and plurality of ceramic workpieces at a power, time and frequency sufficient to ignite the oxidizer and to cause a liquid phase seal to form; and
   f. allowing said seal and workpieces to cool, thereby securing a ceramic-glass-ceramic seal.

2. The method of claim 1 wherein said step of microwaving comprises microwaving at a frequency of about 2.45 GHz.

3. The method of claim 1 wherein said liquid phase seal is formed at a temperature above 1250° C.

4. The method of claim 1 wherein said oxidizer is a nitrate.

5. The method of claim 4 wherein said nitrate is sodium nitrate.

6. The method of claim 1 wherein said oxidizer is dissolved in the coupling agent glycerol.

7. The ceramic-glass-ceramic seal produced by a method comprising the steps of:
   a. preparing a mixture comprising a glass sealing material, a coupling agent, and an oxidizer;
   b. applying said mixture to a plurality of ceramic workpieces for sealing;
   c. enclosing said ceramic workpieces with other such workpieces;
   d. surrounding said mixture and plurality of ceramic workpieces with an insulative material;
   e. microwaving said mixture and plurality of ceramic workpieces at a power, time and frequency sufficient to ignite the oxidizer and to cause a liquid phase seal to form; and
   f. allowing said seal and workpieces to cool, thereby securing a ceramic-glass-ceramic seal.

8. The ceramic-glass-ceramic seal of claim 7 wherein said seal is a high temperature seal formed at a temperature above 1250° C.

9. The ceramic-glass-ceramic seal of claim 7 wherein said oxidizer is a nitrate.

10. The ceramic-glass-ceramic seal of claim 8 wherein said nitrate is sodium nitrate.

* * * * *